United States Patent [19]

Braconi et al.

[11] 4,230,251
[45] Oct. 28, 1980

[54] AUTOMATIC APPARATUS FOR THE TREATMENT OF LINKS OF METALLIC CHAINS

[76] Inventors: Gustavo Braconi, 250 Ponte alla Chiassa, 52010 Arezzo; Giuseppe Valli, 15 Via Tommaso Sgricci, 52100 Arezzo, both of Italy

[21] Appl. No.: 278

[22] Filed: Jan. 2, 1979

[30] Foreign Application Priority Data

Jan. 10, 1978 [IT] Italy ..................... 47572 A/78

[51] Int. Cl.³ .................... B23K 1/14; B21L 3/02
[52] U.S. Cl. ...................... 228/41; 228/192; 118/419
[58] Field of Search .............. 228/41, 192; 118/74, 118/419, 427

[56] References Cited

U.S. PATENT DOCUMENTS

| | | | |
|---|---|---|---|
| 962,413 | 6/1910 | Benjamin | 228/192 |
| 1,775,839 | 9/1930 | Wenz et al. | 228/192 |
| 2,009,573 | 7/1935 | Bradley | 118/427 X |
| 4,059,926 | 11/1977 | Rampe | 118/419 X |

Primary Examiner—Francis S. Husar
Assistant Examiner—K. J. Ramsey
Attorney, Agent, or Firm—Cushman, Darby & Cushman

[57] ABSTRACT

Automatic apparatus for the treatment of the links of metallic chains which comprises, in operative sequence: means for the automatic application of soldering powder to the chains being treated; means for the automatic removal of the excess of soldering powder applied to said chains; and means for the automatic application of a powder which isolates each chain link from the next during the soldering operation. The application and removal means also have the function of movable guide means for the chains being treated.

6 Claims, 5 Drawing Figures

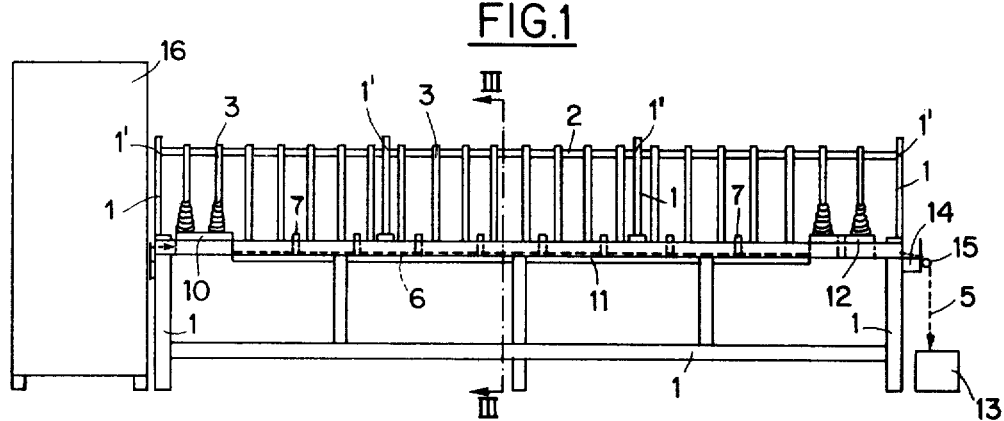
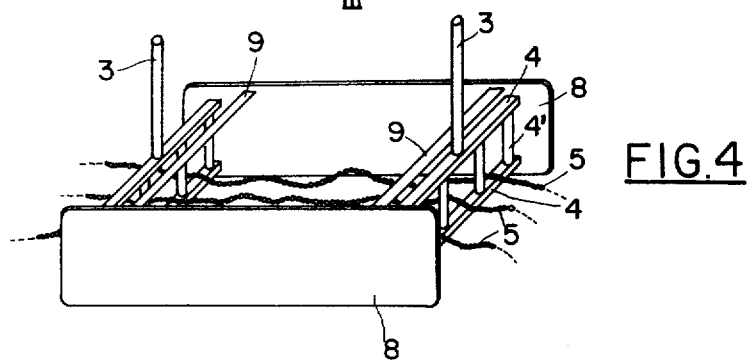
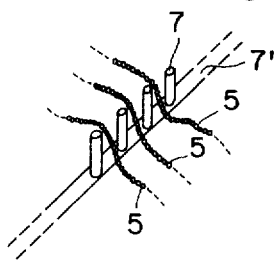

AUTOMATIC APPARATUS FOR THE TREATMENT OF LINKS OF METALLIC CHAINS

The present invention relates to an apparatus for effecting mechanically and automatically the operations relating to the preparation for soldering and also, eventually, the soldering operation itself of metallic chains or the like, and particularly gold and silver chains.

It is known that said chains are obtained using different types of automatic machines which determine the formation of the single links, in an open ring shape and with their terminal extremities almost in contact with each other; in correspondence to these extremities there must be effected the junction by soldering. The problem connected with said soldering operations has been resolved utilizing particular soldering powders which, occupying the interstice between the surfaces of the terminal extremity of each link, effect the soldering operation when the entire chain is passed through a flame or the like so as to impart to the zone to be soldered a temperature higher than the melting point of the powder which is retained in said interstice.

The complete operative cycle, which comprises the phases relating to the preparation for the soldering operation and, subsequently, the soldering operation itself of the metallic chains, consists of the following successive fundamental operations:

(a) a wash bath of the chain links being worked upon effected in a solvent, such as trichloroethylene or the like;

(b) a second bath effected in a mixture of trichloroethylene and castor oil, so as to apply an oily film on said links;

(c) complete evaporation of said solvent by heating;

(d) application of the soldering powder, which must obviously be suitable for use with the metal of which the chain is composed (in particular a powder based on phosphorus and zinc in the case of gold and silver), said application being realized by immersing the chain in a container of said powder;

(e) removal of the excess of the soldering powder, so that there remains only the necessary quantity in the interstice between the almost-contacting surfaces of the terminal extremities of each single link of the chain;

(f) application of a powder such as talcum in order to isolate reciprocally at the points of contact the single links of the chain, rendering them independent and slidable with respect to each other, in order to avoid the junction or fusion with each other when the closing sealing operation is effected; this operation is also effected by immersing and stirring the chains inside a container of talcum powder; and finally (g) the soldering operation itself of each link effected by flame-treating the chain in question so as to obtain, as a result of the fusion of the powder remaining in the respective interstices, the soldering by the respective links.

Object of the invention is to provide an apparatus which renders completely automatic the aforementioned operative cycle, also eventually including the final soldering operation, and which obtains at the same time the best results relative to the preparation for soldering of the links of metallic chains. This automatic realization of the operations in succession which, once established the optimal operating conditions, assures the retention of only the necessary quantity of soldering powder in the interstice of each single chain, guarantees constantly said optimal results.

Another important characteristic of the present apparatus is that it can operate at the same time on more than one chain.

The apparatus according to the invention is characterized by comprising in operative succession: means for the automatic application, by shaking, of the soldering powder to one or more chains to be treated; means for the automatic removal, by shaking, of the excess of said applied powder so that there remains, retained on the interstices of each single link, only the quantity necessary for the subsequent soldering operation; and means for the automatic application, by shaking, of an isolating powder, such as talcum or the like, in order to isolate the links with respect to each other. Said application and removal means have also the function of movable guide means for the chains being treated, which undergo a mixed transversal and longitudinal movement, on an almost horizontal plane, resulting in a continuous advancement along the longitudinal direction of the apparatus.

Upstream from said means of applying the soldering powder there is installed a container in which there is realized automatically, by means of transportation on advance and return rollers, the treating operations in the aforementioned baths and the subsequent heating operation of the open-link metallic chains, produced on automatic machines of the known type. Downstream of said means for applying the isolating powder there can be eventually installed the burner for the soldering operation, such as to be able to realize automatically also the soldering operation.

For a better understanding of the present invention and in order to demonstrate how said invention can be realized in practice, there is now set forth the following detailed description of an operative embodiment thereof, by way of example and not of limitation, with particular reference to the attached drawings in which:

FIG. 1 is a schematic, lateral, elevational view of the complete apparatus according to the invention;

FIG. 4 is a schematic axonometric view of the means of the apparatus of FIG. 1 for the application of the soldering powder on three working lines; and FIG. 5 is an axonometric view of a set of fixed guides forming part of the apparatus of FIG. 1 and of three simultaneous working lines.

Figure 2:
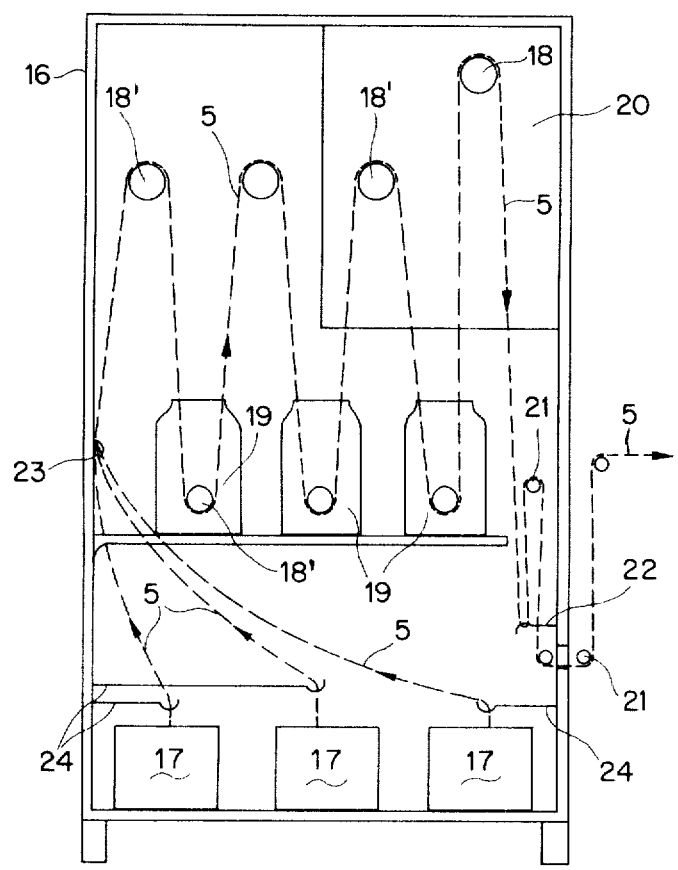
FIG. 2 is a schematic, lateral, elevational view, on an enlarged scale, with the lateral panel of closure removed of the container which constitutes the left beginning section of the apparatus of FIG. 1.

With reference to said figures, the apparatus of the invention comprises a frame 1 which supports a horizontal pin 2, of a certain length, which, in the illustrative example, is of about 4 meters. Said horizontal pin 2, mounted on said frame in a rotatable manner about its longitudinal axis corresponding to 1', is connected to a regulable electric motor of operation, not shown in the drawings, through standard connecting or driving means, from which it receives the rotational oscillatory movement. Pin 2 carries a certain number of vertical arms 3, rigidly fixed to it, all of the same length, having at their lower section a small bracket consisting of two transversal bars 4, parallel with and spaced from each other, connected between each other by four small vertical pins 4', transversally equidistant from each other, which thus form, taken two by two, three movable devices for shaking and guiding one, two or three chains which are thus simultaneously treated by the apparatus. In the illustrative example, there has been represented the simultaneous tratment of three chains 5. Said arms 3, receiving through pin 2, with which they are fixedly connected, an oscillatory movement in a transverse direction, determine the continuous shaking of the chains being treated on the grated bottom and against the lateral walls, which are also grated, of a tub 6, shaped in the form of a horizontal channel, extending longitudinally from the apparatus and fixed to said frame 1.

The chains, during their passage through said tub 6, also pass through fixed slide guides, consisting of four small vertical fixed pins 7, shown in FIGS. 1 and 5, transversely spaced, and which, taken two by two, create a passageway for each chain being treated. Said small vertical pins 7 are disposed in rows of four, spaced in a longitudinal direction along the grated bottom of tub 6. The pins 7 of each row are fixed at the lower part thereof to a cross-bar 7', which is in turn fixed to the bottom of tub 6. Said rows of rods 7, in addition to act as additional guides for the chains, limit their lateral (transversal) shaking movement, preventing an accumulation of said chains in one zone of the treatment tub 6 and thus a resulting traction to other zones of the same tub 6, which traction could result in a breakage of the chains.

The first pair of oscillating arms 3, disposed at the left section of the apparatus illustrated in FIG. 1, provides for the application by shaking, of the soldering powder on the chains. Between these two arms there is not provided the intermediate guide of four vertical pins 7, but at the lateral extremities of brackets 4, 4' of said arms are fixed two metallic plates 8, vertical and parallel, of a substantially rectangular shape, transversely connected by means of two metallic rods 9, which thus form a metallic box, open at the bases, around said brackets. Said box, rigid with the brackets of the two arms 3, also receives the oscillatory motion transmitted by the horizontal pin 2 and moves within a small closed container 10, fixed to the frame of the apparatus upstream of tub 6 and adjacent to the latter. Said small closed container 10 contains the soldering powder which is thus applied to the chains which, immersed in said powder, are continuously shaken, while they pass through the movable slide guides consisting of brackets 4, 4'. Said oscillating box, together with the two arms 3, serves thus to prevent, thanks to the dragging of plates 8 on the bottom of small tub 10, the lateral accumulation of said powder, accumulation which could easily occur due to the poor sliding characteristics of said powder.

Another eighteen arms 3, located following said first couple, have the function of removing from the links of the chains being treated the excess soldering powder, so that there remains only the quantity necessary for the soldering operation at the interstices of the links. Said excess powder, which is removed from the chains, is discharged downwardly through the grated bottom and the walls, also grated, of the horizontal tub 6. The strong removal or cleaning action, mechanical and automatic, is due to the continuous shaking of the chains being treated as they pass the movable guides of brackets 4, 4'.

Figure 3:
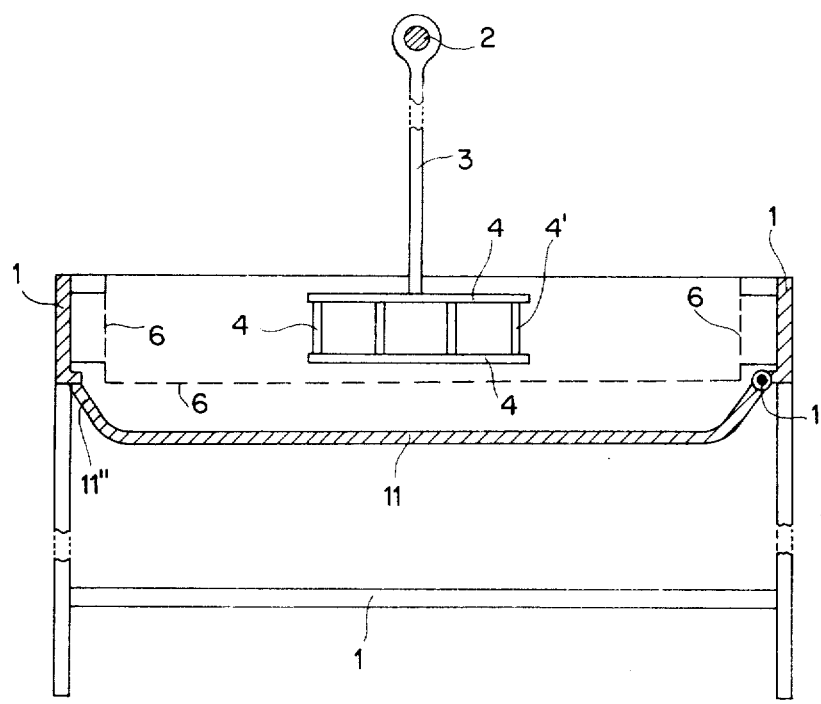
FIG. 3 is a schematic, transverse sectional view, on an enlarged scale and with parts removed, taken along line III—III of FIG. 1.

About every two brackets for the removal of the powder is located a row of fixed guides consisting of vertical pins 7 through which pass the chains being treated, so as to reduce the shaking action on said chains in their lateral (transversal) direction. Said excess powder, after passing through the grates of tub 6, falls and is collected into a container 11, which extends below and longitudinally throughout the entire length of tub 6 and which, in correspondence to is side 11', is pivotally mounted on frame 1 of the apparatus, as seen in FIG. 3, while, in correspondence to its side 11", is removably attached to said frame. The powder is then recovered manually or, eventually, also automatically by means of a suitable carrying belt or the like mounted below tub 6.

The last two oscillating arms 3, between which is located a row of four vertical pins 7, perform an action slightly different than that of the arms which preceed them, in that they do not serve to effect the function of shaking to remove from the chains the excess soldering powder, but serve to effect a shaking action on the chains while they pass through a small closed container 12 which contains a suitable dry isolating substance, such as talcum powder, which serves to isolate the individual links with respect to each other so as to avoid that said links become soldered to each other during the subsequent soldering phase.

In this case there is not provided at the lateral extremities of the two brackets 4, 4' for the application of a box, such as was the case for the first pair of oscillating arms 3, inasmuch as the talcum powder has sliding characteristics much superior to those of the soldering powder.

The advance of each chain through tub 6, constant in the longitudinal direction of same, could be effected by gravity means alone, that is, the extremity of the chain as it exists from small container 12 would fall simply by gravity into a suitable collector 13, being collected there in the form of an irregular skein. In cases where the advance through gravity does not guarantee a sufficient movement of the chains in the apparatus of the invention, there is also provided the possibility (as illustrated in FIG. 1) of mounting, for each line of operation and downstream of small container 12, in a parallelepipedal-shaped support 14 fixed onto frame 1, a threaded pin 15, rotatably activated by a relative electric motor, on which pin there winds, and is then carried toward the collector, the chain being treated.

Downstream of the threaded pins 15 there can, eventually, be installed the soldering burner, not shown in the drawings, to effect in a complete automatic working cycle also the soldering operation. This can be realized by means of further suitable return rolls operated by an electric motor.

Upstream of the small container 10 it is also possible to provide means for effecting mechanically and automatically also the operations of application of the treatment baths (first in a solvent such as trichloroethylene, and then in a mixture of solvent and castor oil) and of the heating operation for the solvent removal. This is realized in a container 16, substantially parallelepipedal, shown in FIGS. 1 and 2, at the lower plane of which there are found collectors 17 containing chains irregularly mixed therein, i.e., mixed in the random manner in which they exit from the automatic production machines. Each chain is advanced by means of a rotatable driving roller 18 (driven by an electric motor, not shown) and is guided onto a series of return rollers 18' so as to pass in succession in three containers 19. In each of them is contained a treating solution, in the order: (a) in the first container, trichloroethylene; (b) in the second container trichloroethylene to effect a further washing action; (c) in the third container, a mixture of trichloroethylene and castor oil.

At the exit from the third container 19 containing the mixture of trichloroethylene and castor oil, each chain being trated passes through an automatic forced air heating device, which provides for the complete evaporation of the trichloroethylene. The heating zone is indicated with 20 in FIG. 2. In this manner the chain is dried completely prior to its entry into the small closed container 10, where the application of the soldering powder takes place. Obviously this passage also takes place on return rollers 21.

At the inside of container 16 there is also provided a sensor 22 which, connected to the electric driving motor for roller 18, controls the advance of each chain being treated, commanding said motor in function of the feeding needs for the chains, said needs varying according to the operating characteristics of the apparatus. There are also present a microswitch 23 which stops the advance movement of the chains in cases where there are present, in said chains, eventual impediments, such as knots, as well as chain-end switches 24 (in a number equal to that of collectors 17) which stop the operation of the apparatus as soon as there is no more chain in the respective collector.

Then, summarizing the fundamental characteristics of the apparatus of the invention consists in practice in the possibility of realizing automatically all the operative treatment cycle of the chain links, from the aforementioned treatment baths up to and including the soldering operation. Such automatic operation permits in effect the obtainment of high operative outputs. With particular reference to the phase relative to the removal of excess powder, it is noted that it is effected solely and exclusively by means of a purely mechanical shaking effect, without the need of any auxiliary cleaning substances, such as sand, grit, etc.. To this may be added that there is definitely obtained a perfect preparation of the chain links for the soldering process in the sense that it is possible to guarantee the constancy of the titre of the precious metal which constitutes the chains thanks to the fact that in the interstices of said links there is retained only that quantity of soldering powder which is necessary for their junction. Further, it is not necessary, with the automatic apparatus of the invention, that each chain produced by the automatic machine be initially wound in regular, orderly skeins, tied with bands or the like, before undergoing the treatment operations, but it is sufficient that said chain be irregularly accumulated into the collectors 17, i.e., in the random manner in which it exits from said production machines.

It can be easily realized that, with the apparatus of the invention, there can be treated simultaneously more than three chains, suitably modifying the brackets 4, 4' and correspondingly increasing the number of the fixed pin guides 7.

It is obvious that numerous other variations can be effected by those skilled in the art to the example set forth as illustrative of the present invention without departing from the spirit of the same and it is understood that all said variations fall within the scope of the present invention.

What is claimed is:

1. Automatic apparatus for the treatment of links of metallic chains, said apparatus comprising, in operative sequence: means for the automatic application, by shaking, of the soldering powder to one or more chains being treated; means for the automatic removal, by shaking, of the excess of the powder thus applied so that there remains, retained in the interstices of the individual links, only the quantity necessary for the subsequent soldering; and means for the automatic application, by shaking, of an isolating powder, such as talcum or the like, as to isolate the links one with respect to the other, said application and removal means comprising movable brackets shaking said chains and at the same time guiding them in a mixed transversal and longitudinal movement in an almost horizontal plane.

2. Apparatus according to claim 1 wherein said brackets are rigidly carried by the lower sections of corresponding vertical arms spaced along the longitudinal direction of the apparatus and are disposed transversely to said longitudinal direction, each of said brackets including two transverse parallel bars, spaced and connected with each other by vertical pins disposed equally spaced in the transversal direction as to constitute movable shaking and guiding members for the same number of chains to be treated, said vertical arms, and therefore said brackets, receiving an oscillatory motion in a transverse direction through a horizontal pin mounted on the frame of said apparatus and caused to oscillate alternately about its longitudinal axis.

3. Apparatus according to claim 2, wherein the brackets which form said means of application of the soldering powder carry on their lateral extremities two vertical and parallel plates which, on receiving the transverse oscillatory movement from said brackets, with which they are rigidly fixed move within the inside of a small container, fixed on the frame of said apparatus and containing said soldering powder, preventing the lateral accumulation of same.

4. Apparatus according to claim 3, wherein the brackets which form said means for the application of the isolating powder move within the inside of a small container which contains said isolating powder and which is fixed on the frame of the apparatus.

5. Apparatus according to claim 1 which comprises, along the path of the chains being treated, fixed slide guides which limit the transversal shaking movement of said chains, said fixed slide guides consisting of vertical pins transversally spaced to form a certain number of transversal rows and constituting, taken in pairs, a guide.

6. Apparatus according to claim 1 which comprises, downstream of said means of application of the isolating powder, a burner for the soldering operation and roller means for continuously feeding said chains to said burner.

* * * * *